United States Patent
Martin et al.

(10) Patent No.: US 10,842,160 B2
(45) Date of Patent: Nov. 24, 2020

(54) METHOD AND APPARATUS FOR AUTOMATICALLY PACKAGING AND DISPENSING FOOD PRODUCTS

(71) Applicant: F.R. DRAKE COMPANY, Waynesboro, VA (US)

(72) Inventors: Gregg A. Martin, Charlottesville, VA (US); Thomas Ivy, Smithfield, VA (US); Andre Richards, Charlottesville, VA (US)

(73) Assignee: F.R. Drake Company, Waynesboro, VA (US)

( * ) Notice: Subject to any disclaimer, the term of this patent is extended or adjusted under 35 U.S.C. 154(b) by 99 days.

(21) Appl. No.: 15/979,924

(22) Filed: May 15, 2018

(65) Prior Publication Data

US 2018/0325129 A1    Nov. 15, 2018

Related U.S. Application Data

(60) Provisional application No. 62/506,109, filed on May 15, 2017.

(51) Int. Cl.
| | |
|---|---|
| *B65B 11/02* | (2006.01) |
| *A22C 17/00* | (2006.01) |
| *B65D 75/06* | (2006.01) |
| *B65D 77/02* | (2006.01) |
| *B65B 11/10* | (2006.01) |

(Continued)

(52) U.S. Cl.
CPC .......... *A22C 17/0093* (2013.01); *B65B 11/02* (2013.01); *B65B 11/105* (2013.01); *B65D 75/06* (2013.01); *B65D 75/42* (2013.01); *B65D 77/02* (2013.01); *B65B 25/065* (2013.01)

(58) Field of Classification Search
CPC ... G07F 17/0078; B65B 25/065; B65B 25/06; B65B 9/02; B65B 9/067
See application file for complete search history.

(56) References Cited

U.S. PATENT DOCUMENTS

| | | | | |
|---|---|---|---|---|
| 3,051,583 | A | * | 8/1962 | Tindall ................. B65D 85/672 426/115 |
| 3,224,361 | A | * | 12/1965 | Ojelid .................... G07F 9/105 99/332 |

(Continued)

OTHER PUBLICATIONS

U.S. Appl. No. 15/945,874, filed Apr. 5, 2018, First Named Inventor: Gregg A. Martin.

*Primary Examiner* — Timothy R Waggoner
(74) *Attorney, Agent, or Firm* — Berenato & White, LLC

(57) ABSTRACT

A food product gathering and dispensing system is disclosed. The food product is generally a flat disc shaped article dispensed onto a consumable strip of food product conveyer material. The food product is fed to single, or series related, spools that wind up the consumable conveyer material and food product into a removable roll or stack. The roll or stack is placed into a dispenser pack, optionally subject to further environmental treatment, and refrigeration. The pack is then installed within a refrigerated dispenser system where the food product and consumable material are collectively unwound and/or separated, as the food product is fed into a processing system, i.e., a cooking device. The consumable conveyer material is collected and separately discarded.

20 Claims, 5 Drawing Sheets

(51) Int. Cl.
*B65D 75/42* (2006.01)
*B65B 25/06* (2006.01)

(56) References Cited

U.S. PATENT DOCUMENTS

| | | | | |
|---|---|---|---|---|
| 3,989,853 A | * | 11/1976 | Forkner | A23G 3/0294 426/305 |
| 4,387,831 A | * | 6/1983 | McNally | B65D 5/72 221/25 |
| 5,065,894 A | * | 11/1991 | Garland | A61F 15/002 221/25 |
| 5,113,754 A | * | 5/1992 | Robinson | A47J 37/044 99/326 |
| 5,685,944 A | * | 11/1997 | Nose | B65H 37/007 156/540 |
| 7,644,838 B2 | * | 1/2010 | Leykin | G07F 9/105 221/150 A |
| 2006/0261082 A1 | * | 11/2006 | Almblad | B65B 69/00 221/260 |

* cited by examiner

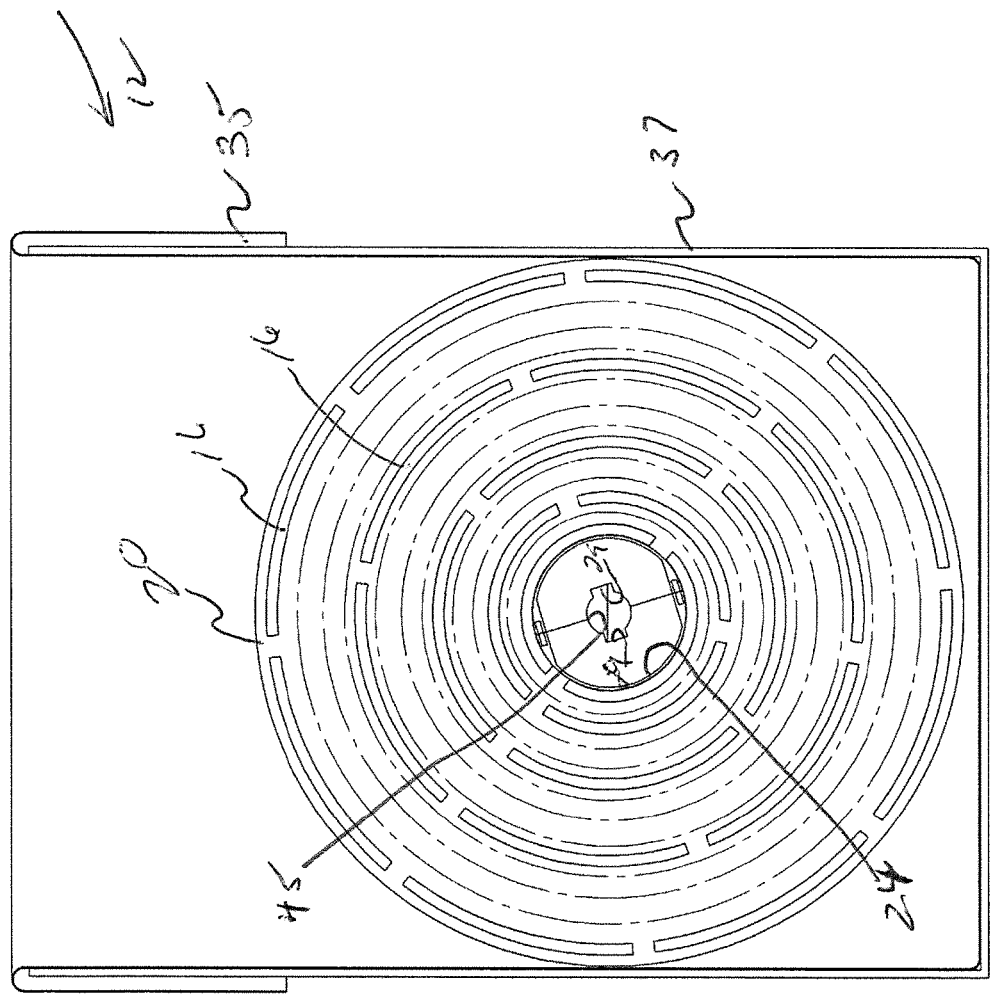

METHOD AND APPARATUS FOR AUTOMATICALLY PACKAGING AND DISPENSING FOOD PRODUCTS

CROSS-REFERENCE TO RELATED APPLICATIONS AND CLAIM TO PRIORITY

This application claims the benefit of provisional application Ser. No. 62/506,109, filed May 15, 2017 in the United States of America, the disclosures of which are incorporated herein by reference and to which priority is claimed.

FIELD OF THE INVENTION

The present invention relates to a method and associated apparatus for automatically placing food products into a rolled or otherwise gathered package, a so-called "Dispenser Pack". The Dispenser Pack may then used for storage, specialized environmental treatment, and shipping and/or can be otherwise integrated into a packaging system containing a plurality of the rolled or otherwise similarly gathered food products. At the site that receives the Dispenser Pack, the rolls, or otherwise gathered food products, can be connected with or otherwise attached to a machine for automatically dispensing the food products according to the needs of the receiving site. The food products may be disc-like food products, such as hamburger patties, sausage patties, vegetable patties and any other similarly generally flat and typically disc-shaped food products. Typically the dispensed food products are cooked or otherwise prepared for consumption at the site receiving the Dispenser Packs.

BACKGROUND OF THE INVENTION

Producers in the food industry are under pressure to remain competitive by reducing cost. One known method for reducing cost is to reduce the number of workers and replace them with automated systems to the greatest extent possible.

In addition, food producers must keep their food products as clean and as sanitary as possible, usually requiring compliance with sanitary standards. Studies have shown, for example, that any time some human touches an object many thousands of microbes are unwittingly transferred to the object. Therefore, eliminating any human contact with food is a significant way to potentially reduce the number of microbes present with a food product, and thus increase food safety. A system that eliminates all human contact with a food product is highly desirable.

SUMMARY OF THE INVENTION

This invention is a system having three major parts: the Gathering System used to form and fill Dispenser Packs; the Dispenser Pack itself; and, the Dispensing System for unloading the Dispenser Pack on location and allowing the food products to be dispensed for subsequent processing. Each part will be explained individually, which collectively will ultimately describe the whole system. The Gathering and Dispensing Systems are separate units that typically can/will be in different locations.

Gathering System

The Gathering System collects an inflow of food products that are presented from a processing station, such as via a consumable conveyor belt. U.S. patent application Ser. No. 15/945,874, filed Apr. 5, 2018, the disclosure of which is incorporated herein by reference, discloses an exemplary Gathering System. The consumable conveyor belt becomes part of the overall package or Dispenser Pack. The Gathering System arranges the food products more compactly for ease of storing and transporting the food products thereafter. One such method is to roll up the food products with the consumable belt on which the food products are presented.

The Gathering System keeps track of the number of food products being gathered using an optical, magnetic, Hall Effect or like non-contact sensor or counter. When the desired count is reached, the gathering operation is stopped and the complete Dispenser Pack wound onto a spool is detached from the processing line of the Gathering System and placed into a shipping container or other package for transporting the complete Dispenser Pack. Alternatively, an extendable output conveyor may be used to buffer the food products for a short period while the rolls automatically change in order to not stop the Gathering System while spools are changed.

A new blank or empty Dispenser Pack spool may then automatically inserted into the processing line and the process starts again for that specific feed of food product.

All of these tasks are done automatically, such as robotically, without the need for any direct or indirect human contact with the food or surfaces on which the food is placed.

Dispenser Pack

The Dispenser Pack serves two purposes. The first purpose is to hold the compactly arranged food products in such a way that the Dispenser Pack and its food products can be easily stored and transported. The second purpose is to be able to be automatically loaded by the Gathering System, as well as automatically dispensed into the desired process for that specific food product, again without the need for human contact with the food products. The Dispenser Pack may include a corrugated cardboard container or the like that is appropriately sized to hold the rolled conveyor belt with its food products.

The Dispenser Pack has an integral spindle/spool that is also a functional part of the dispensing system. The spindle has a connector that fits over a mandrel in the dispensing system or is otherwise operably connected to the dispensing system in order to allow the conveyor belt and its food products to be unwound as necessary. The mandrel may or may not be powered. The spindle serves as the mechanism to transmit torque from the mandrel to the spool to assist the winding/unwinding process.

Dispensing System

The purpose of the Dispensing System is to have the ability to be loaded with a Dispenser Pack and then automatically dispense the contained food products in the desired speed and frequency for any manner of further processing. With a minimal amount of work and with no human contact with the food products, Dispenser Packs can be loaded into and unloaded from the Dispensing System.

The Dispensing System may include a refrigeration system and an insulated exterior structure capable of maintaining temperature of internal food products below 40 degrees F. This temperature enhances food safety, particularly for non-frozen food products, and also maintains the firmness of the Dispenser Pack while allowing it to function properly with the Dispensing system.

BRIEF DESCRIPTION OF THE DRAWINGS

FIG. 5 is a cross-section taken along the line 5-5 of FIG. 2A.

DETAILED DESCRIPTION OF THE PREFERRED EMBODIMENT

Figure 1:
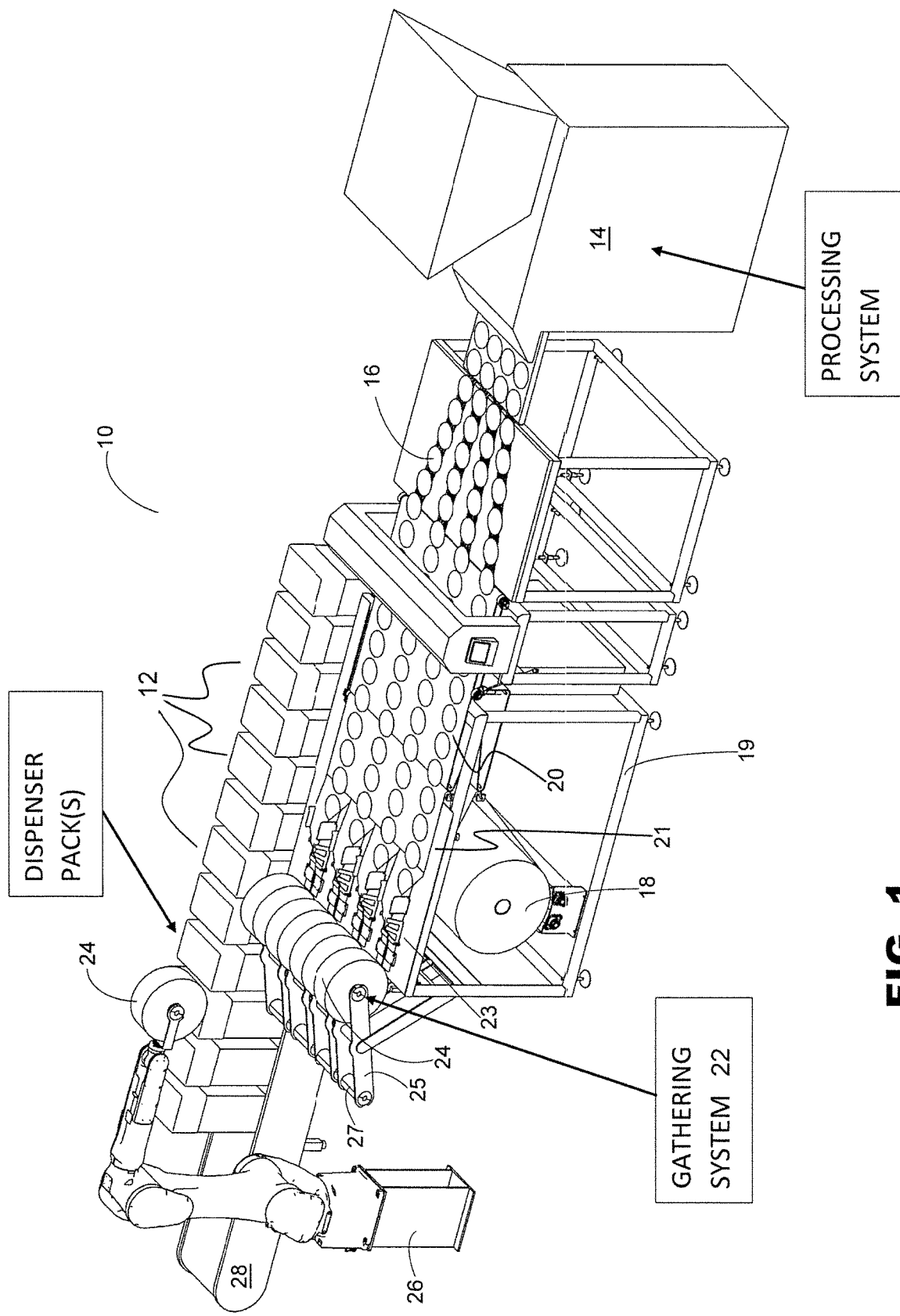
FIG. 1 is an oblique view of the overall food product unit gathering system.

The operation of the Gathering System 10 is as follows:

Food products 16 are fed to the Gathering System spool end 22 on a single consumable conveyor belt (or material) 20, which preferably is a thin polymer material, such as a food grade polyethylene film that is approximately 0.005 inches thick and twelve (12) inches wide, that is suitable for the flat, disc-like food products 16 being gathered. The consumable conveyor belt in this case is a single conveyor belt 20 that can be detached or cut from the processing system 14, at which food products are initially collected, and become part of the Dispenser Pack 12. The single conveyor material 20 is fed and cut from a single supply roll 18, in this case placed beneath the Gathering System conveyer bed 21, and within frame 19.

The Gathering System 10 collects the food products 16 and by rolling the belt 20 onto spool(s) 24, or folding or any other process, which captures the food products 16 in a compact manner at end 22. The rolled belt 20 with its contained food products 16 are then placed within a Dispenser Pack 12 that is removed from the Gathering System 10 for transport. The Gathering System spool end 22 includes a series of pivoting frames elements 25 that are configured to mount spools 24 at either end of the pivot on mandrel(s) 27. As a spool 24 is filled, an empty spool 24 is mounted onto the mandrel opposite the filled spool 24. The pivoting frame element 25 is swung so as to simultaneously remove the filled spool 24 and replace it in the filling position with an empty spool 24. The filled spool 24 is then removed, such as by robot 26, and placed into an awaiting empty Dispenser Pack 12 while the newly positioned replacement spool 24 is ultimately filled.

Figure 4:
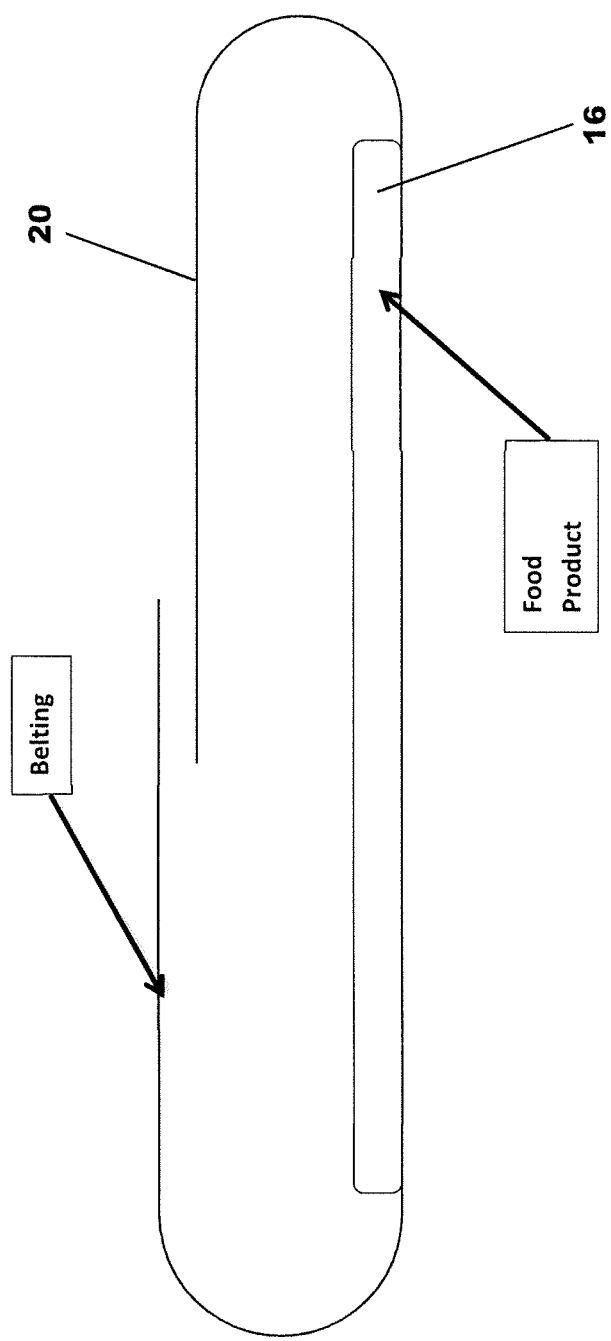
FIG. 4 is a detailed schematic of the food product wrapped in disposable conveyor belting.

The Gathering System may include a belt folding device 23. Belt folding device 23 may use excess belt width from conveyer 20, having parallel cut longitudinal edges, of adjacent feed tracks (if more than one is present), initially folded upwardly and then folded again, one edge toward the other, and laid over the top surfaces of successive food products 16, thereby completely encapsulating the food products 16 in an extended "tube" structure. The food products 16 are thereby covered top and bottom as they are wound onto the spool 24. This configuration is shown in FIG. 4.

The Gathering System 10 counts the incoming food products 16 and when a programmable pre-determined number is reached it will stop, and also signal upstream equipment to stop if necessary. Once the Gather System 10 line is stopped, the Gathering System cuts the consumable conveyor 20, such as with a knife, laser or the like, and collects the counted food products 16, and closes the folded end of the consumable belt 20 to keep food products 16 from falling off the spool 24.

The Gathering System 10 robotic machine 26 then replaces the filled spool 24 with an empty spool 24 that has been pre-loaded onto the Gathering System onto the pivoting frame elements 25. This can be done manually, or automatically, but is preferably done free from human contact. Once the empty spools 24 are in place, the Gathering System splices, via a heat cutter/sealer, for example, associated with folder 23, the end of the consumable conveyor belt 20 or belts to the new empty spool 24. Consumable belts can be made of a material, i.e., food grade plastic film, that can be heat fused, or by some other method, joined to the leading edge of an empty spool 24. A preferred material for the conveyor belt 20 is a polyethylene film that is approximately 0.005 inches thick and twelve (12) inches wide. The film should not be too elastic because the rolled conveyor belt 20 and food products 16 would, in that event, be excessively tight and distort the food products 16 when rolled on the spool 24. Coated paper may also be used. The material of the conveyor belt 20 should also have good release properties, so that the food products 16 do not stick to the belt 20, particularly during removal. The full spools 24 are unloaded and new blanks spools loaded, as noted previously, while the newly attached spools 24 are being loaded.

Dispenser Packs

Figure 2B:
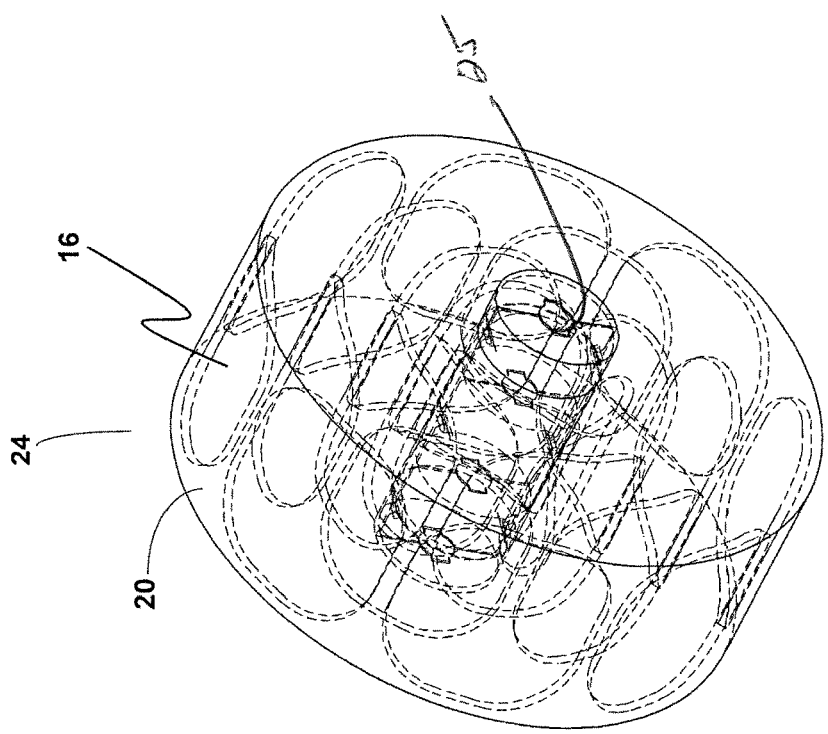
FIG. 2B is a partially transparent perspective view of a spindle or spool of food product gathered in accord with the present invention.
Figure 2A:
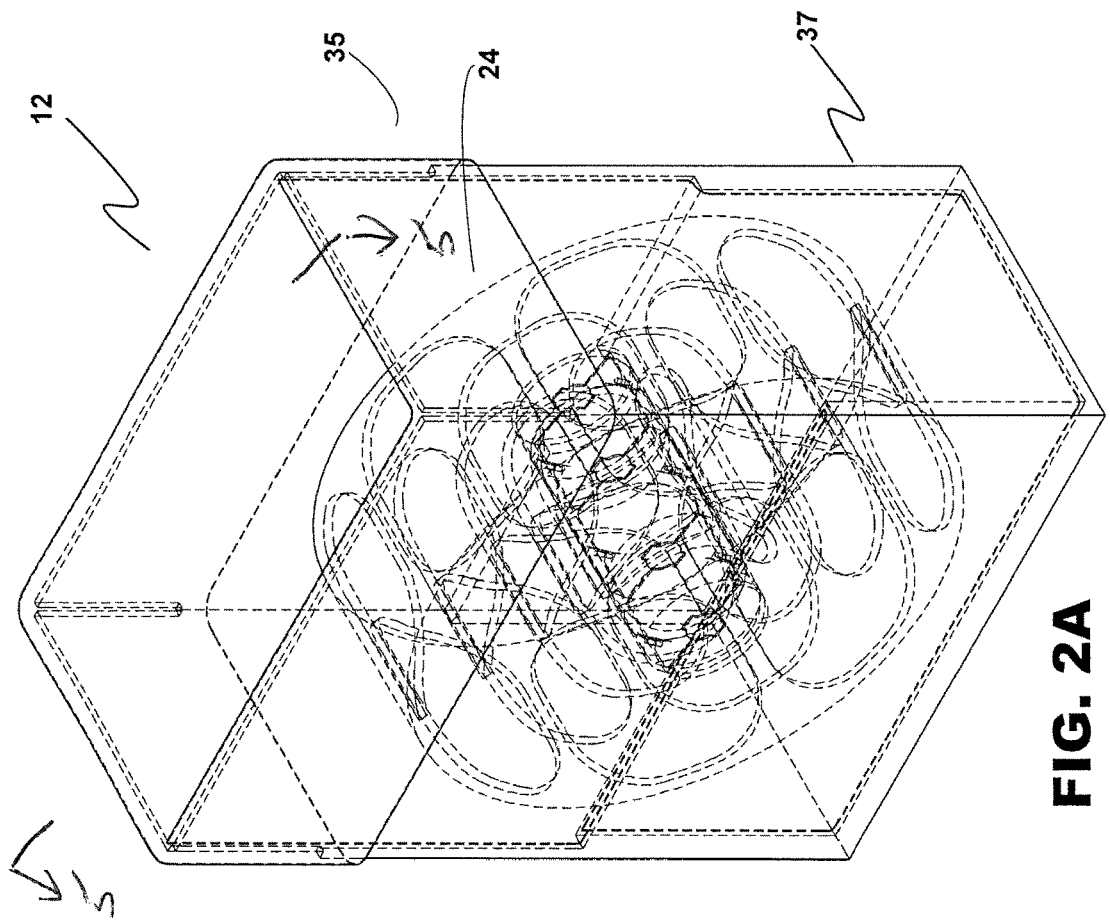
FIG. 2A is partially transparent perspective view of a dispenser pack in accord with the present system.

As shown in FIGS. 2A, 2B and 5, Dispenser Packs are units of food products 16 that have been collected on a consumable belt 20 and arranged in a compact manner around a contained spool 24. The contained spool 24 preferably has a cylindrical configuration, as best shown in FIG. 2B, with the outermost wrap being the consumable belt 20 in order to enclose the wound food products 16 and minimize contamination of the food products 16. The spool 24 preferable has a notched or female connector 45 at one end for mating with the mandrel 27 to allow rotation of the spool 24 during gathering and dispensing of food products. The connector 45 has two radially outwardly extending notches 29 that interconnect with mandrel 27. The Dispenser Pack 12 can be automatically loaded and unloaded, and the food products within each Dispenser Pack 12. The dispenser Pack 12 includes a container, preferably a two-piece box having a removable top 35 and a bottom 37 that can be transported and/or sealed in a suitable larger package as needed. The top 35 and bottom 37 together form a closed container, preferably of corrugated cardboard or the like, within which a wound or filled spool 24 is received along with its food products 16.

The Dispenser Packs 12 are configured so that they either can be individually provided, or grouped into an even larger container, and that the container can also go through a modified atmosphere packaging process or MAP, i.e., oxygen removal using nitrogen or another purge gas. In other words, a single Dispenser Pack 12 or a plurality of Dispenser Packs 12 contained within a larger surrounding container may be exposed to a MAP process to reduce oxygen content and thus minimize microbe growth potential.

A suitable Dispenser Pack 12 is shown as a rolled version using a spool 24, but other Dispenser Pack configurations can be used. Separate, top and bottom, disposable conveyers may be used, fused along respective sides and between each food product. A "snaked" stack of food product may also be used where successive food products are stacked one atop the other with disposable conveyer located between and separating stacked food product elements. The compact stack may then be placed into a package and subject to environmental treatment, i.e., oxygen purge, etc. and refrigeration.

Dispensing System

Figure 3:
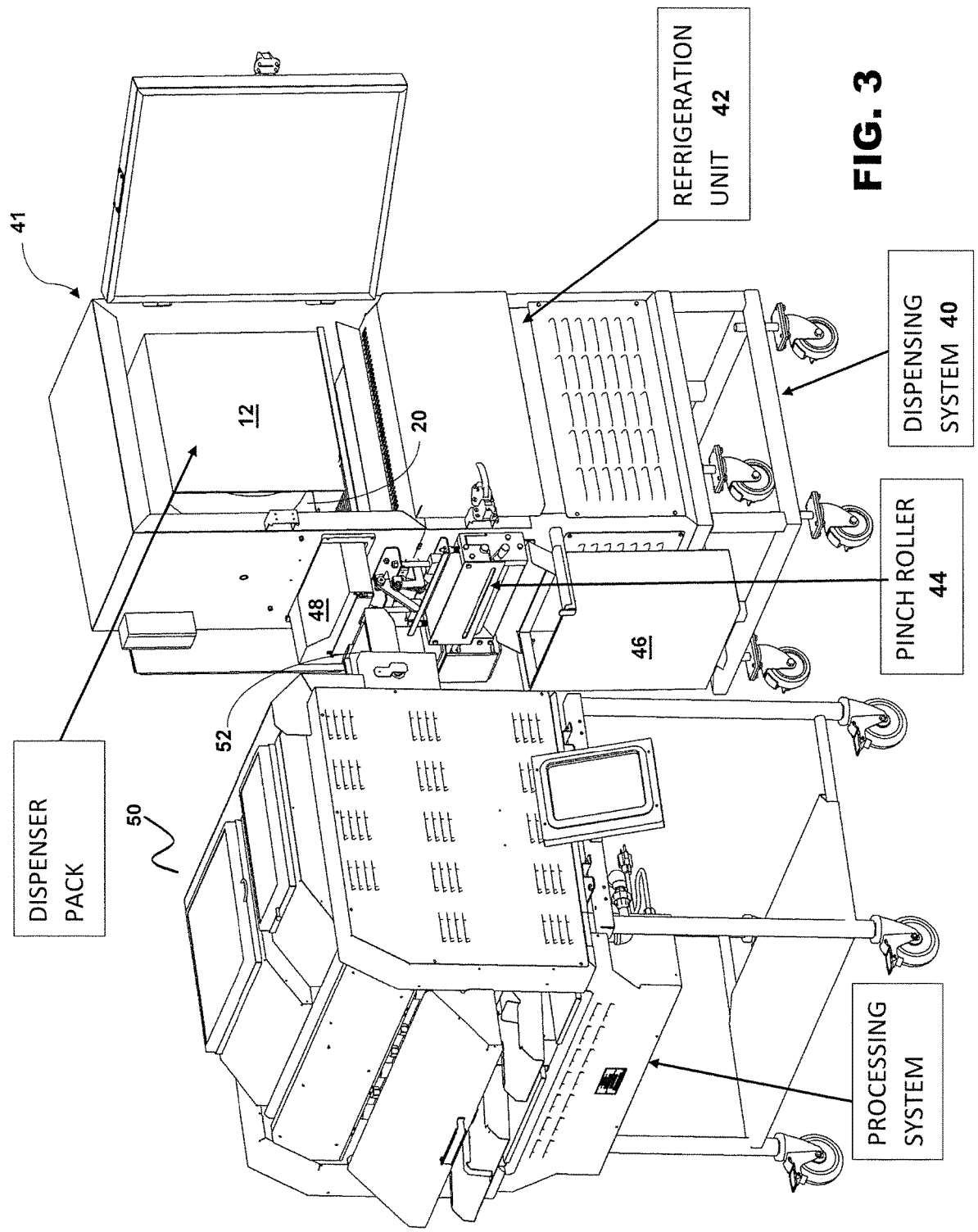
FIG. 3 is an oblique view of a dispensing system in accord with the present invention.

The structure and function of the Dispensing System is as follows:

Dispenser Packs 12 are loaded into the Dispensing System 40, as best shown in FIG. 3. The consumable belt 20 of the Dispenser Pack 12 is threaded out through the Dispensing System 40 at exit slot 48. The conveyer 20 is unwound from around the food products 16, and then proceeds downwardly onto a take-up reel system 44. The threaded consumable belt 20 becomes a conveyor belt that presents the food products 16 to any sort of adjacent processing unit 50 that is required. The Dispensing System 40 meters out the food products 16 at a programmable rate. As the food products 16 get metered out they transfer off the consumable belt 20 and onto/into the separate processing unit 50, for example, onto an intake feed conveyer 52 for the processing system.

The Dispensing System 40 may include a refrigeration unit 42 that cools the upper compartment 41 where the Dispenser Packs 12 are placed for unwinding. The refrigeration unit 42 makes the Dispensing System 40 a stand-alone device that can maintain the fresh food products 16 in ready to use condition.

The Dispensing System 40 has an optical, mechanical, magnetic, Hall Effect or like non-contact sensor to sense when a Dispenser Pack 12 is empty. When this happens, the Dispensing System 40 signals an operator, or separate piece of automated equipment, to remove the empty Dispenser Pack 12 and the consumable belt 20 from the take up reel and empty, as necessary, the refuse collection box 46 positioned below the transfer point from the Dispenser System 40 to the processing system 50. The refuse collection box 46 collects drips of food product 16 which may collect on and drop from the conveyer 20 as it is wound onto the take-up reel/pinch roller 44. A full Dispenser Pack 12 is then loaded into the refrigerated upper compartment 41, the conveyer 20 threaded through the Dispensing System 40 and the dispensing process can begin again.

The Dispensing System 40 can have a plurality Dispenser Packs 12 that are controlled individually. The purpose of this feature is to have the ability to dispense different food products (i.e. beef, turkey, chicken, vegetable) from different Dispenser Packs 12 at different speeds. Food products 16 can be dispensed to single or multiple lanes for further processing, such as cooking.

We claim:

1. A food product dispensing system for fresh food products, comprising:
   a refrigerated compartment; and
   a refrigeration unit for refrigerating the compartment and maintaining products therein in a non-frozen state;
   the refrigerated compartment including a mount for receiving and unloading a container having a spool therein with food products in a non-frozen state and a single consumable conveyer material wrapped there around in an encapsulated form;
   the food product dispensing system further comprising a food and consumable conveyer separating system for separating each of the food products from the consumable conveyer material including a take-up reel for winding used consumable conveyer material, and a delivery system for providing the food products individually to a separate device for further processing.

2. The food product dispensing system, as in claim 1, further comprising a collection container positioned beneath the take-up reel for accumulating drippings from each of the food products created by the separating system.

3. The food product dispensing system of claim 1, wherein the consumable conveyer material encapsulates individualized food product units therein via folded portions of the consumable conveyer material that fold with respective outer edges of the consumable conveyer material folded one toward the other, and form a tube completely containing the food product such that successive wound layers of the consumable conveyer material on the spool are placed adjacent successive layers of the consumable conveyer material.

4. The food product dispensing system of claim 3, wherein the food products are individualized fresh patties of food product.

5. The food product dispensing system of claim 1, wherein the food products are encapsulated in a food gathering system into the consumable conveyer material to form a food gathering system package, and wherein the food gathering system package comprises:
   a first food package comprising the consumable conveyer material wrapped around successive food products, wherein at least one layer of the consumable conveyer material separates successive food products; and
   a second package having an open interior for accepting, storing and transporting the first package.

6. The food product dispensing system of claim 5, wherein the first package comprises a spool of conveyer product with successive food products completely wrapped and contained between adjacent layers of the consumable conveyer material.

7. The food product dispensing system of claim 5, wherein the second package is a container having a first part separable from a second part for accessing an open interior.

8. The food product dispensing system of claim 5, wherein the second package is a corrugated container.

9. The food product dispensing system of claim 5, wherein the consumable conveyer material is a polyethylene film.

10. The food product dispensing system of claim 5, wherein the open interior has a reduced oxygen content.

11. The food product dispensing system of claim 10, wherein the food products are fresh meat products.

12. The food product dispensing system of claim 5, wherein the food products are disc-shaped.

13. The food product dispensing system of claim 12, wherein the food products are flat.

14. The food product dispensing system of claim 5, wherein the first package includes the spool onto which the consumable conveyer material is wound.

15. The food product dispensing system of claim 14, wherein the spool has a connector at a first end for operable attachment to a mandrel.

16. The food product dispensing system of claim 5, wherein the food products are any of hamburger patties, sausage patties, and vegetable patties.

17. The food product dispensing system of claim 5, wherein the consumable conveyer material is a heat-fusible belt.

18. The food product dispensing system of claim 5, wherein the first container is cylindrical and has an outer wrap of conveyor material.

19. The food product dispensing system of claim 15, wherein the connector is a female connector.

20. The food product dispensing system of claim 19, wherein the female connector has radially outwardly extending notches for interconnecting with the mandrel.

* * * * *